US012263135B2

(12) United States Patent
Liu et al.

(10) Patent No.: US 12,263,135 B2
(45) Date of Patent: Apr. 1, 2025

(54) EYE EXERCISING DEVICE AND METHOD

(71) Applicant: Wei Liu, Shenzhen (CN)

(72) Inventors: Wei Liu, Guangdong (CN); Junlong Liu, Guangdong (CN); Junchao Liu, Guangdong (CN); Juntao Liu, Guangdong (CN); Junshuai Liu, Guangdong (CN)

(73) Assignee: Wei Liu, Shenzhen (CN)

( * ) Notice: Subject to any disclaimer, the term of this patent is extended or adjusted under 35 U.S.C. 154(b) by 1171 days.

(21) Appl. No.: 17/055,997

(22) PCT Filed: Jun. 17, 2019

(86) PCT No.: PCT/CN2019/091549

§ 371 (c)(1),
(2) Date: Nov. 17, 2020

(87) PCT Pub. No.: WO2019/242583

PCT Pub. Date: Dec. 26, 2019

(65) Prior Publication Data

US 2021/0212881 A1 Jul. 15, 2021

(30) Foreign Application Priority Data

Jun. 19, 2018 (CN) ........................ 201810631816.2

(51) Int. Cl.
*A61H 5/00* (2006.01)

(52) U.S. Cl.
CPC ....... *A61H 5/00* (2013.01); *A61H 2201/0188* (2013.01); *A61H 2201/5007* (2013.01); *A61H 2201/5092* (2013.01)

(58) Field of Classification Search
CPC .............................. A61H 15/00; A61H 15/005
See application file for complete search history.

(56) References Cited

U.S. PATENT DOCUMENTS 6,742,892 B2 * 6/2004 Liberman ................ A61H 5/00 351/203
7,446,762 B2 * 11/2008 Hsieh ....................... G09G 5/00 351/203

(Continued)

FOREIGN PATENT DOCUMENTS

CN 203315293 U 12/2013
CN 103948489 A 7/2014

(Continued)

*Primary Examiner* — LaToya M Louis
(74) *Attorney, Agent, or Firm* — Birchwood IP

(57) ABSTRACT

The invention relates to an eye exercising device and method. The eye exercising device includes a carrier, a controller, and two or more than two light-emitting units. Each of the light-emitting units is sequentially installed on the carrier, and is electrically connected with the controller. The controller is used to control each of the light-emitting units to operate in a corresponding state at corresponding time according to an eyeball exercise program. The eye exercising device further includes a detector, a prompting structure and a light-extraction module. The detector can get the user's eye problems and guide the user to exercise their eyeballs. The prompting structure can remind the user to exercise the eyes regularly. The light-extraction module can generate a guiding light spot that is easy for the user to recognize, which effectively protects the eyes.

19 Claims, 5 Drawing Sheets

(56) References Cited

U.S. PATENT DOCUMENTS

| | | | | |
|---|---|---|---|---|
| 11,774,759 | B2 * | 10/2023 | Hsiao | G02B 27/0179 345/8 |
| 11,806,079 | B2 * | 11/2023 | Yam | A61B 3/113 |
| 2009/0009714 | A1 * | 1/2009 | Clarke | A61B 5/161 351/203 |
| 2017/0296420 | A1 * | 10/2017 | Ahn | A61H 35/02 |
| 2021/0290053 | A1 * | 9/2021 | Tran | A61B 3/113 |
| 2022/0413294 | A1 * | 12/2022 | Hsiao | H04N 13/128 |
| 2023/0149249 | A1 * | 5/2023 | Koziak | A61H 5/005 601/37 |
| 2023/0233072 | A1 * | 7/2023 | Haimovitch-Yogev | G06T 7/0012 351/209 |
| 2023/0301505 | A1 * | 9/2023 | Shaw | A61H 5/005 |
| 2023/0337909 | A1 * | 10/2023 | Occhipinti | A61B 3/032 |

FOREIGN PATENT DOCUMENTS

| | | | |
|---|---|---|---|
| CN | 105476826 | A | 4/2016 |
| CN | 206621523 | U | 11/2017 |
| CN | 107616901 | U | 1/2018 |
| CN | 107997933 | A | 5/2018 |
| DE | 202010014816 | U | 1/2012 |

* cited by examiner

EYE EXERCISING DEVICE AND METHOD

TECHNICAL FIELD OF THE INVENTION

The invention relates to the technical field of eye health care, in particular to an eye exercising device and method.

DESCRIPTION OF THE PRIOR ART

According to statistics, 4 billion people in the world have visual impairment, most of which are caused by knowledge deficit and improperness of using eyes, and only 2-3% of which are caused by genetics, that is, the visual impairment of most people can be avoided or rescued. Living in the information era today, people have a strong dependence on mobile phones, computers and other electronic products in both work and life, which leads to long-term, close-up staring at the screen. In addition, as modern people are under high work pressure, fast-paced life, and high mental stress, especially the problem of light pollution everywhere, the eyes are used excessively every day, thus that leads to a large number of modern people's visual impairment. Therefore, it is urgent to prevent visual impairment as early as possible.

Wearing glasses to solve the problem of visual impairment is a common method. However, myopia is the result of paralysis caused by the lack of movement of the muscles around the eyes, and wearing glasses is done in the same way as a person who has had a stroke chooses a wheelchair. If the muscles around the eyes are not fully exercised, vision will be further worsened. Another traditional solution is to use laser surgery on the cornea, which is also a temporary solution, and the eyes have to bear greater risks. Therefore, how to effectively protect the eyes is an urgent problem to be solved.

The light source directly shines on the eyes, so there is a very strong bright spot in the center of the luminous light source in vision, which makes the eyes very uncomfortable and may burn the eyes in more severe cases. In addition, as we know, the light emitted by the light source presents a stereoscopic divergence distribution in the three-dimensional space, which cannot form a visual guide target with clear boundaries, nor provide a clear focus point for the eye, and therefore cannot guide the eye for precise scientific exercising. In fact, the exercising methods and focuses for various problems of eye muscle absolutely differ, so it is necessary to carry out targeted exercising on eye muscles to improve the exercising effect.

SUMMARY OF THE INVENTION

Based on this, it is necessary to provide an eye exercising device and method for the problem of how to effectively protect the eyes.

An eye exercising device includes a carrier, a controller, a detector and two or more than two light-emitting units, wherein each of the light-emitting units is sequentially installed on the carrier, the controller is electrically connected with each of the light-emitting units and the detectors.

The detector is used to get video information including a user's eye exercising state, and send the video information to the controller. The controller is used to formulate an eyeball exercise program suitable for the user according to the video information, and control each of the light-emitting units to operate in a corresponding state at corresponding time according to the eyeball exercise program.

In one of the embodiments, the outside of the light-emitting unit is covered with a protective layer.

In one of the embodiments, the light emitting unit includes a light source and a light-extraction module. The light source is electrically connected to the controller. The light-extraction module is used to adjust the light emitted by the light source.

In one of the embodiments, the light-extraction module includes one or more of a light-mixing unit, a light-homogenizing unit, and a light path adjusting unit.

In one of the embodiments, the light-extraction module adjusts light for two or more than two light-emitting sources, and the light-extraction module includes a light-isolating component between different light sources (to prevent light from intersecting each other) and a light-extraction adjustment module of single light source, the latter of which can be a light-homogenizing component such as a directional light-emitting component and a light guide film.

In one of the embodiments, the eye exercising device further includes a prompting structure electrically connected to the controller. The controller is used to remind the user to exercise his/her eyes regularly through the prompting structure.

In one of the embodiments, the light-emitting units of a first set number are arranged in a column along longitudinal direction, the light-emitting units of a second set number are arranged in a row along transverse direction, and the row intersects with the column and the longitudinal direction is perpendicular to the transverse direction as well; or The light-emitting units of a third set number are arranged in an ellipse, and the light-emitting units of a fourth set number extend from the first vertex of the ellipse to the second vertex of the ellipse within the ellipse, and the light-emitting units of a fifth set number extend from the third vertex of the ellipse to the fourth vertex of the ellipse within the ellipse, wherein the first vertex, the third vertex, the second vertex, and the fourth vertex are connected in sequence to form a rectangle; or All the light-emitting units are arranged in a spiral shape or a fold line shape.

An eye exercising method is suitable for an eye exercising device that includes a carrier, a controller, a detector, and two or more than two light-emitting units. Each of the light-emitting units is installed on the carrier in turn, and the controller is respectively electrically connected to each of the light-emitting units and detectors. The method is executed by the controller and includes the following steps:

- getting video information including a user's eye exercising state detected by the detector during the last time the user exercises his/her eyes;
- formulating an eyeball exercise program suitable for the user according to the video information;
- controlling each light-emitting unit to operate in a corresponding state at a corresponding time, according to the eyeball exercise program.

In one of the embodiments, the step of formulating an eyeball exercise program suitable for the user according to the video information includes the following sub steps:

- calculating the actual movement track of the eyeball according to the video information;
- comparing the actual movement track with the target movement track and formulating an eyeball exercise program suitable for the user according to the comparison result.

In one of the embodiments, the step of controlling each of the light-emitting units to operate in a corresponding state at a corresponding time, according to the eyeball exercise program, is that:

according to the eyeball exercise program, each of the light-emitting units is controlled to operate in a corresponding state at a corresponding time to form a light spot moving in a different state or a pattern with a changing size.

In one of the embodiments, before the step of controlling each of the light-emitting units to operate in a corresponding state at a corresponding time according to the eyeball exercise program, the method further includes the following steps:

getting exercising parameters;

and the step of controlling each of the light-emitting units to operate in a corresponding state at a corresponding time, according to the eyeball exercise program, is that:

the eyeball exercise program is adjusted according to the exercising parameters, and each of the light-emitting units is controlled to operate in a corresponding state at a corresponding time according to the adjusted eyeball exercise program.

The above-mentioned eye exercising device have the following beneficial effects: the light emitted by the light source is adjusted by the light source module to generate a comfortable guide light spot for the human eye, that is, the dazzling light of the light source divergently distributed in the three-dimensional space is transformed into a comfortable visual guide target with clear boundaries for human eyes, which effectively removes the central light intensity of the light source to avoid eye burns, and at the same time generates a moving light spot with clear boundaries to drive the eyeballs for precise scientific exercising and improve the exercising effect. In addition, because the detector can get video information containing the user's eye exercising status, the controller can detect the problems of eyes in time based on the video information, and formulate an eye exercise program suitable for the user aimed at the problems of eyes to instruct users to exercise their eyes accordingly by the light-emitting unit. Therefore, the eye exercising device can instruct the user to perform timely and targeted exercising on the eyeball against the user's problem of eyes, so that the eye can be effectively protected.

BRIEF DESCRIPTION OF THE DRAWINGS

In order to describe the embodiments of the present invention or the technical solutions in the prior art more clearly, the embodiments or the drawings that need to be used in the description of the prior art will be briefly introduced as below. Obviously, the drawings in the following description are only some embodiments of the present invention. For the person skilled in the art, without creative work, the drawings of other embodiments can also be obtained based on these drawings.

DETAILED DESCRIPTION OF THE INVENTION

Figure 1:
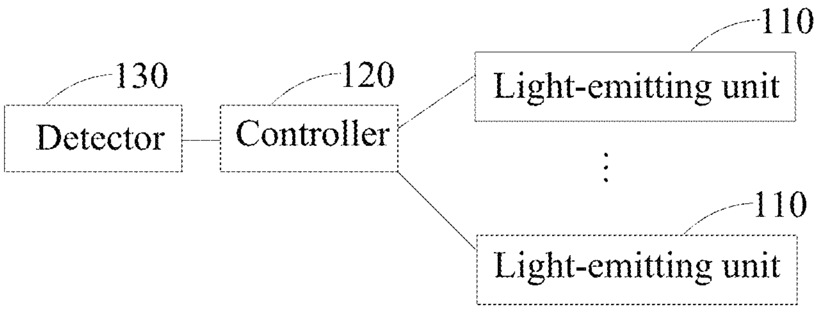
FIG. 1 is a block diagram of the eye exercising device provided by one embodiment.

In order to facilitate the understanding of the present invention, the present invention will be described more fully as below with reference to the relevant drawings. The preferred embodiments of the invention are shown in the drawings. However, the present invention can be actualized in many different forms and is not limited to the embodiments described herein. On the contrary, the purpose of providing these embodiments is to make the understanding of the disclosure of the present invention more thorough and complete.

Unless otherwise defined, all technical and scientific terms used herein have the same meaning as commonly understood by those skilled in the technical field of the invention. The terms used in the description of the invention herein are only for the purpose of describing specific embodiments, and are not intended to limit the present invention. The term "and/or" as used herein includes any and all combinations of one or more related listed items.

Tension alternating with relaxation represents mental and physical exercises, in the same way, as for the eyes, they also need tension alternating with relaxation. Especially nowadays, people work under more pressure, and the focus of life and work is concentrated on electronic products such as mobile phones and computers, which makes people's use of the entire organs of eyes unprecedentedly overloaded, and the eyes are also in line with the natural evolutionary rule of evolution in usage and degeneration without usage, so it is necessary to enhance its function by strengthening exercise. The eyes, like other human organs, need health care and more exercise. Life rests with movement, and the eyes also need exercise. After scientific exercise, the eyes will be healthier and have higher tolerance. Therefore, one embodiment provides an eye exercising device, which assists the eyes with sufficient scientific exercises by the adoption of advanced science and technology (such as display technology, sensor detection technology, smart technology), thereby to enhance the physiological functions of the eyes. Just like a person's physical strength that can originally persist in running 2000 meters, through scientific continuous exercising, he/she can run a marathon.

Please refer to FIG. 1, FIG. 5 to FIG. 9, the eye exercising device includes the carrier 150, two or more than two light-emitting units 110, the controller 120 and the detector 130. Each of the light-emitting units 110 is sequentially installed on the carrier 150. The controller 120 is electrically connected with each of the light-emitting units 110 and the detectors 130 respectively.

Wherein, the light emitting-unit 110 can emit light to guide the user's eye movements. All the light-emitting units 110 can be arranged according to the target movement track (target movement track such as the elliptical track 10 in FIG. 6). In other words, the arrangement of the light-emitting units 110 can at least make the light spots move along the target movement track.

The light-emitting mode of the light-emitting unit 110 is, for example, that only one light-emitting unit 110 is lit at any time, and each of light-emitting units 110 is sequentially lit in sequence, thus it is equivalent to forming a light spot that can move on the carrier 150, and the moving speed of the light spot can be controlled. In this way, the eyes can follow the light spot and move regularly, so as to achieve the purpose of exercising vision. Eyes are kept on this exercising for a long time, just like people insist on long-distance running for a long time, over time, the various functions and the anti-fatigue ability of eyes will be improved.

Among them, the moving mode of the light spot is, for example:

the first option comprising the following sub options that:

(1) the light spot stays in the upper left corner for t seconds;

(2) the light spot stays in the upper right corner for t seconds;

(3) the light spot stays in the lower right corner for t seconds;

(4) the light spot stays in the lower left corner for t seconds, or the second option comprising the following sub options that:

(1) the light spot rotates clockwise, and the speed is n rev/min;

(2) the light spot rotates counterclockwise, and the speed is n rev/min, or the third option comprising the following sub options that:

(1) the light spot moves from the middle to the left and right sides, the view of the two eyes follows the movement of the light spot respectively, and the displacement speed of the light spot is x mm/s;

(2) the light spot moves up and down from the middle, and the view of the two eyes follows the movement of the light spot respectively, and the displacement speed of the light spot is y mm/s, or the fourth option comprising the following sub options that:

(1) the light spot starts to move clockwise from the center to the left along "∞", and the displacement speed is m mm/s;

(2) the light spot starts to move counterclockwise from the center to the left along " ", and the displacement speed is m mm/sec.

The detector 130 is used to get video information including a user's eye exercising state, and send the video information to the controller 120. The detector 130 is, for example, a camera. The exercising state refers to the eye movement state when the user exercises his/her eyes under the guidance of the eye exercising device. When the user exercises his/her eyes, the position of the eyeball in the video information at different moments will change, so the video information can reflect the actual movement track of the user's eyeball.

The controller 120 is used to formulate an eyeball exercise program suitable for the user according to the video information, and control each of the light-emitting units 110 to operate in a corresponding state at corresponding time according to the eyeball exercise program. Wherein, the controller 120 may, for example, include a control chip and a driving chip. The control chip is, for example, a single chip microcomputer. The driving chip is used to drive the light-emitting unit 110 to operate. The eyeball exercise program includes, for example, formulating the target movement track of the eyeball, the speed of eyeball movement, and the total time of eyeball exercise, thereby to exercise the user's eye axis and/or eye muscles. Specifically, the controller 120 may adjust the state of the light-emitting unit 110 through a data signal and a clock signal.

Each of light-emitting units 110 runs at a corresponding time. For example, according to the eyeball exercise program, at any time, one light-emitting unit 110 is always turned on and the other light-emitting units 110 are turned off, and in the process of the light spot moving once along the target movement track, the light-emitting units 110 that are lit at different moments are the light-emitting units 110 located at different positions.

The controller 120 can also separately control the state (such as color, brightness, and color temperature) of each light-emitting unit 110, thereby to achieve precise control of the color, intensity, and moving speed and path of the light spot. For example, at different moments, the controller 120 controls the light-emitting units 110 located at different positions to be at the lighting state. In this way, each light-emitting unit 110 is sequentially lit to form a phenomenon that the light spots move. The controller 120 can also control the color of the light spot by controlling the light-emitting unit 110 to display corresponding colors (for example, adjusting the three primary colors of red, green, and blue to be in different intensities respectively). In addition, the controller 120 can also change the length of time that the light emitting units 110 are lit to control the moving speed of the light spot.

In this embodiment, the controller 120 can not only control the color coordinates and intensity of each light-emitting unit 110 in turn, thereby to control the color, pattern, size and definition of the light spot, but also can control the change of the color and intensity of multiple light-emitting units 110 at the same time, in order to achieve dynamic effects with aesthetic feeling such as the gradual change of the light spot path to adjust the user's eye muscles, or in order to form a pattern with varying sizes (for example, in order to form characters whose size changes over time) to adjust the user's eye axis.

Based on the above-mentioned method that the light-emitting units 110 are controlled by the controller 120, the controller 120 can control each light-emitting unit 110 to operate in a corresponding state at a corresponding time according to the eyeball exercise program. For example: the controller 120 controls the light-emitting duration of each light-emitting unit 110 according to the speed of eyeball movement; the controller 120 controls each light-emitting units 110 to emit light in sequence in order to make the light spot move along the target movement track; the number of cycles that the controller 120 controls the light spot to move along the target movement track corresponds to the total duration of eyeball exercise.

Therefore, in this embodiment, the detector 130 may take a video in the process that the user exercises his/her eyes according to the eye exercising device. The controller 120 can get the actual movement track of the user's eyeball according to the video information captured by the detector 130. Then, the controller 120 compares the actual movement track of the eyeball with the target movement track. If a deviation is found, it means that something is wrong with the user's vision, then the controller 120 can perform corresponding guidance exercises for the user when the user exercises his/her eyes next time. For example, the controller 120 can increase the number of circular movements of the light spot, and thereby prolong the total duration of eyeball exercise.

In summary, the above-mentioned eye exercising device provided by this embodiment adopts advanced technologies such as remote control technology, detection technology, display technology, and intelligent control technology, and uses comfortable light to remotely guide users to exercise their eyes, which can effectively avoid hurting the eyes. More importantly, the eye exercising device can detect the problems of eyes in time by recording eye movement conditions by the detector 130 (such as speed and track), and contrapuntally guide the user to exercise their eyes according to the user's eye conditions, thereby to enable the user to effectively protect their eyes.

In addition, the above-mentioned eye exercising device provided by this embodiment can be set up on a desk, or hung on a wall, can be placed in a bedroom, office, living room, study, and the like, and can even be placed in public places such as a bus, subway, library, square, etc. It can remind people to free themselves from mobile phones and computers anytime, anywhere, and take time to rest and exercise their eyes. The eye exercising device can also be used as sleeping lights, wall decorations, desktop ornaments, ceiling lights, etc. Moreover, the eye exercising device has low cost, and pertains to a self-healing treatment for the user without side effects, with significant effect in persistent use, also does not need to be carried by the user, and even not need to be worn on the forehead to press the neural network around the eyes.

In one of the embodiments, the outside of the light-emitting unit 110 is covered with a protective layer. Among them, the protective layer is, for example, PC material and tempered glass. By setting the protective layer, it can work with protective effects such as preventing light diffusion, dustproof, and the like, and can also have some effects such as softening light, homogenizing light, and decorating, so as to improve the comfort of human eyes.

Further, each light-emitting unit 110 is provided with a protection circuit, such as a fuse. After one of the light-emitting units 110 is damaged, the protection circuit can disconnect the circuit between the light-emitting unit 110 and the controller 120 in time, so as to avoid affecting the normal operation of other light-emitting units 110.

Figure 3:
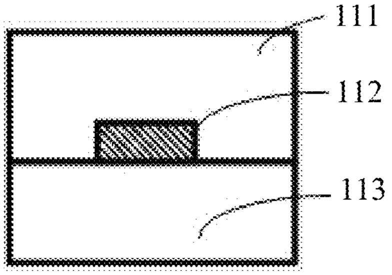
FIG. 3 is a structural diagram of one example of the light-emitting unit of the eye exercising device of the embodiment shown in FIG. 1.
Figure 4:
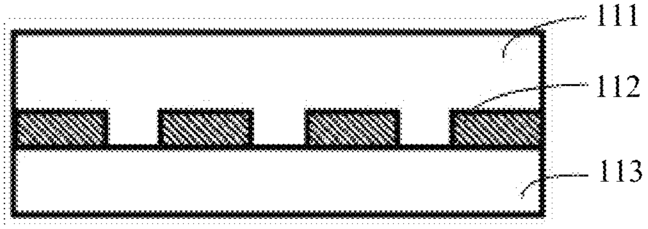
FIG. 4 is a structural diagram of another example of the light-emitting unit of the eye exercising device of the embodiment shown in FIG. 1.

In one of the embodiments, please refer to FIGS. 3 and 4, the light-emitting unit 110 includes a light source 112 and a light-extraction module 111. Wherein, the light source 112 is electrically connected to the controller 120. The light-extraction module is used to adjust the light emitted by the light source. Further, the light-emitting unit 110 further includes a holder 113. The holder 113 is used to install the light source 112 and the light-extraction module 111.

The light source 112 is, for example, a light-emitting device such as an LED and an OLED (Organic Light-Emitting Diode). Specifically, the light source 112 may be integrated with LEDs having three main colors of red, green, and blue. The light-emitting color of the light source 112 may be red, green, blue, or other colors composed of red, green, and blue in different intensities. The user can select different colors. Thus the controller 120 can control the light-emitting unit 110 to emit corresponding colors according to the user's selection. The shape of the light-extraction module 111 may be an arrow, a circle, a heart shape, an animal shape, a plant shape and the like, as long as it is easy for the user to recognize.

The light-extraction module 111 can adjust the color temperature and/or light intensity distribution of the light source 112, so as to improve the comfort of human eyes. Specifically, the light-extraction module 111 includes, for example, one or more of a light-mixing unit, a light-homogenizing unit, and a light path adjusting unit. Among them, the light-mixing unit can achieve mixing light, for example, mixing the light emitted by LEDs in colors of red, green and blue. The light-homogenizing unit can achieve homogenizing light, for example, the light emitted by each LED in the light-emitting unit 110 is evenly divided, so that the light-emitting unit 110 appears to emit light as a whole. The light path adjusting unit can adjust the light path, such as a lens.

Figure 2:
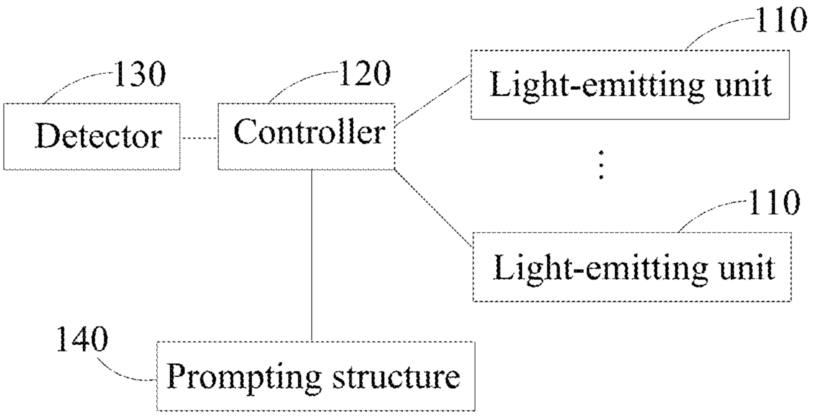
FIG. 2 is a specific block diagram of one example of the eye exercising device of the embodiment shown in FIG. 1.

Specifically, one light-extraction module 111 can be set to adjust light for one light source 112, as shown in FIG. 3. Alternatively, one light-extraction module 111 can also be set to adjust light for two or more light sources 112 together, as shown in FIG. 4. In one of the embodiments, please refer to FIG. 2, the eye exercising device further includes a prompting structure 140 electrically connected to the controller 120. The controller 120 is used to remind the user to exercise his/her eyes regularly through the prompting structure 140.

Among them, the prompting structure 140 is, for example, a clock. In this embodiment, the eye exercising device can prompt the user to stop working at a fixed time (for example, every 1 hour) through the prompting structure 140, and to exercise and rest the eyes for a short time. By moving the eyeballs, the purposes such as relaxing neural network around the eyes, eliminating toxins from the eyes, and improving the function of the eye muscles can be achieved.

It is understandable that the prompting structure 140 can also remind the user in other ways, for example, the user can also be prompted by a light signal, and the light signal can be distinguished from the light emitted by the light-emitting unit 110.

Further, a wireless communication system (such as an infrared remote control system) may be provided in the eye exercising device, and the wireless communication system is electrically connected to the controller 120 inside the eye exercising device, and can perform wireless communication with corresponding equipment outside the eye exercising device, so that the user can remotely and wirelessly control the eye exercising device. For example, assuming that the wireless communication system is an infrared remote control system, the user can use the remote control to wirelessly control the eye exercising device, which is more convenient for the user to use.

In one of the embodiments, the light-emitting unit 110 may have a variety of arrangements, and each arrangement can adjust the user's eye axis and/or eye muscles according to actual conditions. Several specific arrangements of the light-emitting units 110 are as follows.

Figure 5:
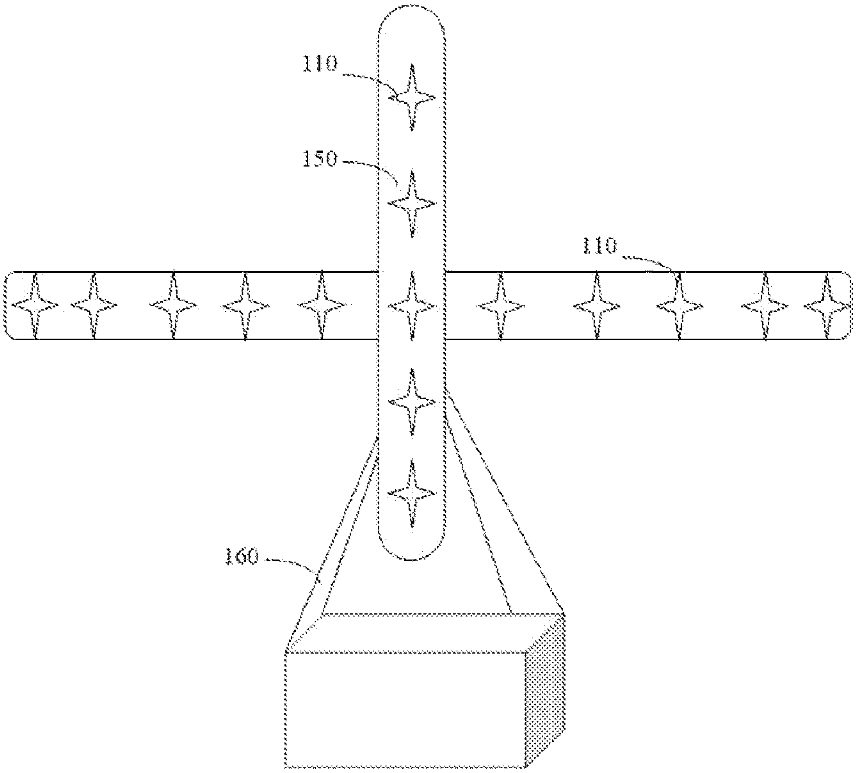
FIG. 5 is a structural diagram of one example of the eye exercising device of the embodiment shown in FIG. 1.

As shown in FIG. 5, the principle of the first arrangement is as follows. The light-emitting units 110 of the first set number are arranged in a column along longitudinal direction, the light-emitting units 110 of the second set number are arranged in a row along transverse direction, and the row intersects with the column and the longitudinal direction is perpendicular to the transverse direction as well. Wherein, the transverse direction is, for example, parallel to the horizontal direction, and the longitudinal direction is parallel to the vertical direction. The sum of the first set number and the second set number is the total number of light-emitting units 110. For example, the first set number is 5, and the second set number is 10. Specifically, the midpoint position of the row is the same as the midpoint position of the column.

Based on this arrangement, the specific structural principle of the eye exercising device is, for example, as follow: the carrier 150 includes a transverse supporting frame and a longitudinal supporting frame. Wherein, the above-mentioned light emitting units 110 of the second set number are sequentially arranged on the transverse supporting frame. The above-mentioned light emitting units 110 of the first set number are sequentially arranged on the longitudinal supporting frame. Meanwhile, the eye exercising device also includes a holder 160. The holder 160 is used to install the transverse supporting frame and the longitudinal supporting frame. It can be understood that the specific structure of the eye exercising device is not limited to the above, as long as all the light-emitting units 110 can be arranged in the first arrangement described above. For example, the carrier 150 can also be an entire panel on which the light-emitting units 110 of the first set number directly are sequentially installed along the longitudinal direction, and the light-emitting units 110 of the second set number are sequentially installed along the transverse direction.

For the eye exercising device, the light spot can first move at a speed Vh from the center to both ends, after arrived at both ends, then move from both ends to the center at the speed Vh on the transverse supporting frame, under the control of the controller 120. In this way, the view of the left and right eyes of the user will follow the light spot to move transversely to both sides, and then return to the center middle, thereby to achieve the purpose of exercising the muscles around the eyes, relaxing neural network of the eyes, eliminating toxins. Similarly, the light spot can first move from the center to both ends at a speed Vz, after arrived at both ends, then move from both ends to the center at the speed Vz on the longitudinal supporting frame. In this way, the view of the left and right eyes of the user will follow the light spot to move longitudinally to both sides, and then return to the center middle, thereby to achieve the purpose of exercising the muscles around the eyes, relaxing neural network of the eyes, eliminating toxins.

Figure 6:
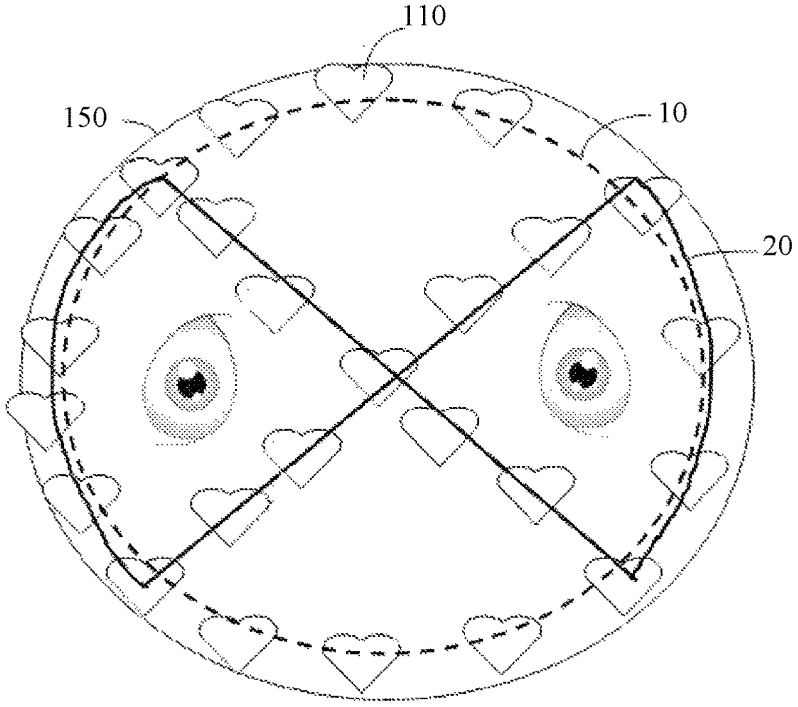
FIG. 6 is a structural diagram of another example of the eye exercising device of the embodiment shown in FIG. 1.

As shown in FIG. 6, the principle of the second arrangement is as follows. The light-emitting units 110 of the third set number are arranged in an ellipse, and the light-emitting units 110 of the fourth set number extend from the first vertex of the ellipse to the second vertex of the ellipse within the ellipse, and the light-emitting units 110 of the fifth set number extend from the third vertex of the ellipse to the fourth vertex of the ellipse within the ellipse, wherein the first vertex, the third vertex, the second vertex, and the fourth vertex are connected in sequence to form a rectangle. Therefore, the light emitting units 110 of the fourth set number and the light emitting units 110 of the fifth set number together form an X shape. The sum of the third set number, fourth set number, fifth set number, and sixth set number is the total number of light emitting units 110. Moreover, in the second arrangement, all the light-emitting units 110 are installed on the carrier 150 together.

Based on the second arrangement, the eye exercising device can form two eye movement tracks, namely, an elliptical movement track 10 and an "∞"-shaped movement track 20.

In the operation process of each light-emitting unit 110 on the elliptical movement track 10, the movement of the light spot can be as follows: the light spot can move along the elliptical movement track 10 in a clockwise direction at a speed Vy, after having moved n laps, then move in a counterclockwise direction, after having moved n laps, and then move in a clockwise direction. It moves so alternately.

In the operation process of each light-emitting unit 110 on the "∞"-shaped movement track 20, the movement of the light spot can be as follows: the light spot can move along the "∞"-shaped movement track 20 in a clockwise direction at a speed Vy, after having moved n laps, then move in a counterclockwise direction, after having moved n laps, and then move in a clockwise direction. It moves so alternately.

The eye exercising device shown in FIG. 6 can be fixed on the wall of the office, or can be set up in public places such as libraries and classrooms after its scale is enlarged. Further, the eye exercising device is provided with luminous texts such as "rescue eyesight" and "care for the eyes", and also with cartoon pattern of eye, thereby to enhance people's awareness of eye protection.

Figure 7:
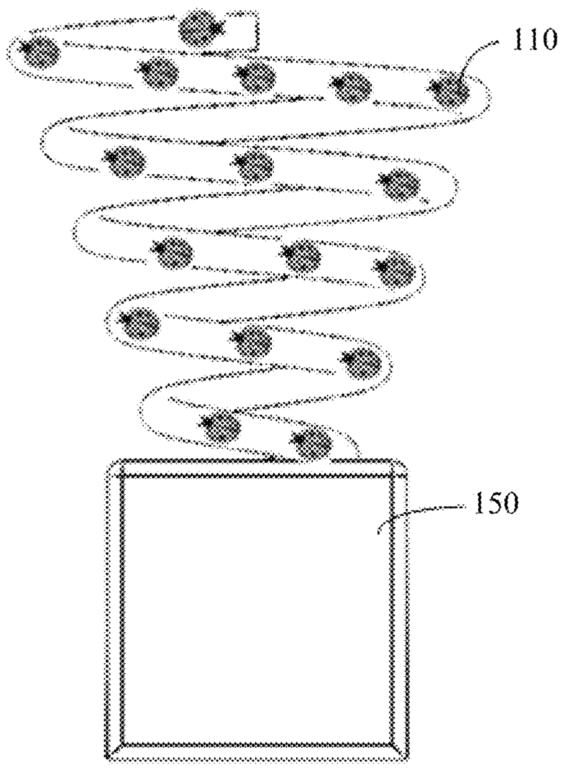
FIG. 7 is a structural diagram of another example of the eye exercising device of the embodiment shown in FIG. 1.

As shown in FIG. 7, the principle of the third arrangement is as follows.

All the light-emitting units 110 are arranged in a spiral shape. In the third arrangement, all the light-emitting units 110 are installed on the carrier 150 together. Specifically, the shape of each light-emitting unit 110 is like a ladybug.

Based on this arrangement, the light spot can start from the bottom, then move along the spiral line at a speed v to the top end, and then return along the original path under the control of the controller 120. It loops so in turn.

Figure 8:
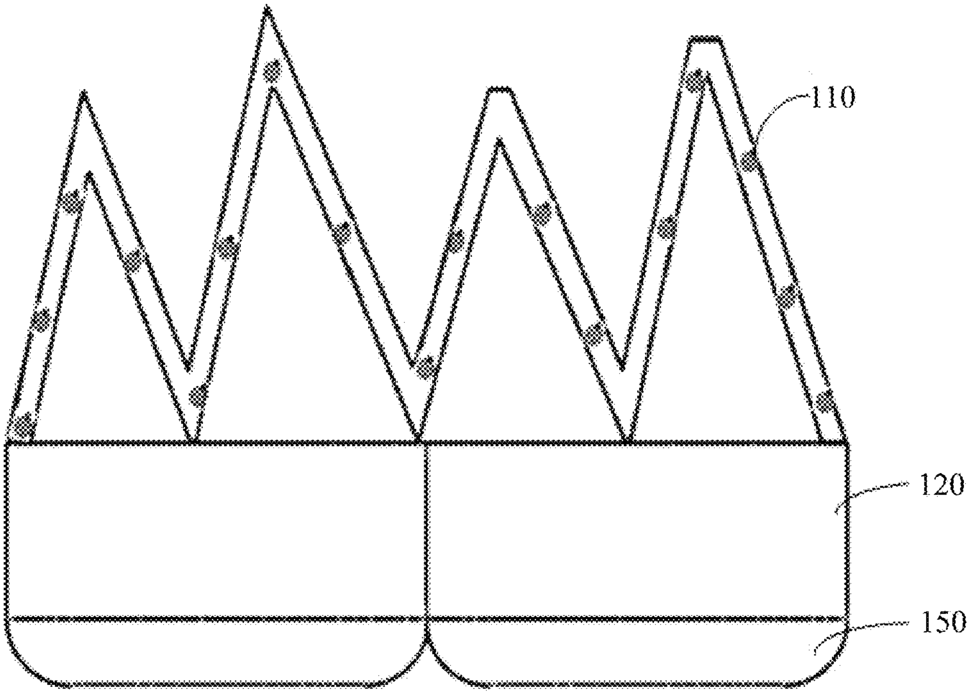
FIG. 8 is a structural diagram of another example of the eye exercising device of the embodiment shown in FIG. 1.

As shown in FIG. 8, the principle of the fourth arrangement is as follows.

All the light-emitting units 110 are arranged in a fold line shape. In the fourth arrangement, all the light-emitting units 110 and the controller 120 are installed on the carrier 150 together. Specifically, the shape of each light-emitting unit 110 is like a ladybug.

Based on this arrangement, the light spot can start from the origination of the fold line, then move along the fold line at a speed v to the termination of the fold line, and then return along the original path under the control of the controller 120. It loops so in turn.

Figure 9:
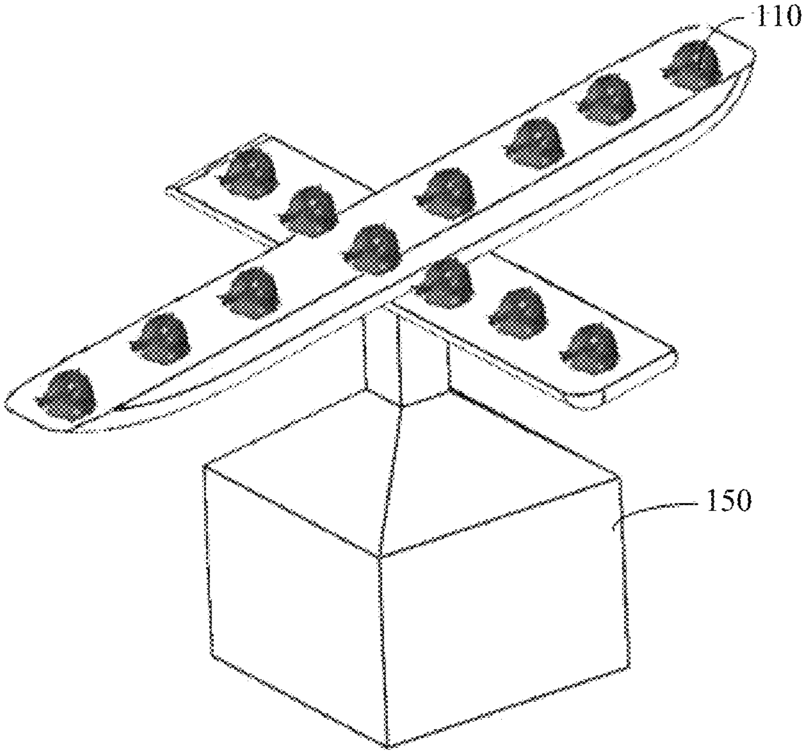
FIG. 9 is a structural diagram of another example of the eye exercising device of the embodiment shown in FIG. 1.

As shown in FIG. 9, the principle of the fifth arrangement is as follows.

The light-emitting units 110 of the first set number are arranged in a column along longitudinal direction, the light-emitting units 110 of the second set number are arranged in a row along transverse direction, and the row intersects with the column and the longitudinal direction is perpendicular to the transverse direction as well. Wherein, the transverse direction is parallel to the horizontal direction, and the longitudinal direction is parallel to the vertical direction. The sum of the first set number and the second set number is the total number of light-emitting units 110. For example, the first set number is 5, and the second set number is 10. In addition, in this arrangement, the shape of the light-emitting unit 110 is like a rose.

The principle of operation of this arrangement is the same as that of the first arrangement, so it will not be repeated here.

It should be noted that the arrangement of all the light-emitting units 110 includes but is not limited to the above-mentioned situations, and other arrangements can be set according to actual needs.

Figure 10:
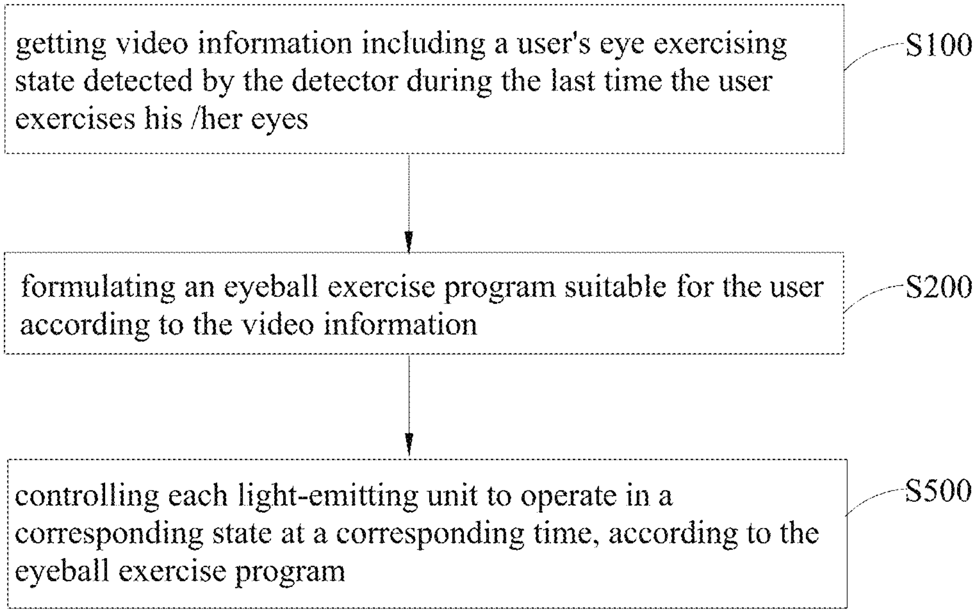
FIG. 10 is a flow diagram of the eye exercising method provided by another embodiment.

Another embodiment provides an eye exercising method, which is applied to the eye exercising device of the above-mentioned embodiment, and is executed by the controller 120. The method includes the following steps, please refer to FIG. 10.

S100 of getting video information including a user's eye exercising state detected by the detector during the last time the user exercises his/her eyes.

The last time is the most recent time. The exercising state refers to the eye movement state when the user exercises his/her eyes under the guidance of the eye exercising device. When the user exercises his/her eyes, the position of the eyeball in the video information at different moments will change, so the video information can reflect the actual movement track of the user's eyeball. Therefore, in this embodiment, every time the eye exercising device is about to guide the user to exercise the eyes, it needs to provide guidance based on the video information obtained by the detector 130 during the last time the user exercises the eyes.

S200 of formulating an eyeball exercise program suitable for the user according to the video information.

The eyeball exercise program includes, for example, formulating the target movement track of the eyeball, the speed of eyeball movement, and the total time of eyeball exercise. In this embodiment, the controller 120 can confirm the state of the user's eyes according to the video information, so that when confirming that the user's eyes are about to or already have problems, it can take an eyeball exercise program that is beneficial to cure the user's vision problems.

S500 of controlling each light-emitting unit 110 to operate in a corresponding state at a corresponding time, according to the eyeball exercise program.

Each of light-emitting units 110 runs at a corresponding time. For example, according to the eyeball exercise program, at any time, one light-emitting unit 110 is always turned on and the other light-emitting units 110 are turned off, and in the process of the light spot moving once along the target movement track, the light-emitting units 110 that are lit at different moments are the light-emitting units 110 located at different positions.

In addition, the controller 120 can also separately control the state (such as color, brightness, and color temperature) of each light-emitting unit 110, thereby to achieve precise control of the color, intensity, and moving speed and path of the light spot. For example, at different moments, the controller 120 controls the light-emitting units 110 located at different positions to be at the lighting state. In this way, each light-emitting unit 110 is sequentially lit to form a phenomenon that the light spots move. The controller 120 can also control the color of the light spot by controlling the light-emitting unit 110 to display corresponding colors (for example, adjusting the three primary colors of red, green, and blue to be in different intensities respectively). In addition, the controller 120 can also change the length of time that the light emitting units 110 are lit to control the moving speed of the light spot.

Specifically, this step is as follow: controlling each of the light-emitting units 110 to operate in a corresponding state at a corresponding time to form a light spot moving in a different state or a pattern with a changing size, according to the eyeball exercise program. Among them, the light spots that move in different states are, for example, have achieve dynamic effects with aesthetic feeling such as the gradual change of the light spot path. A pattern with its changing size is formed, in other words, the size of the pattern changes at different times, for example, a character with its changing size over time is formed, so that the user's eye axis can be adjusted.

Based on the above-mentioned method that the light-emitting units 110 are controlled by the controller 120, the controller 120 can control each light-emitting unit 110 to operate in a corresponding state at a corresponding time according to the eyeball exercise program. For example: the controller 120 controls the light-emitting duration of each light-emitting unit 110 according to the speed of eyeball movement; the controller 120 controls each light-emitting units 110 to emit light in sequence in order to make the light spot move along the target movement track; the number of cycles that the controller 120 controls the light spot to move along the target movement track corresponds to the total duration of eyeball exercise.

Therefore, in this embodiment, the detector 130 may take a video in the process that the user exercises his/her eyes according to the eye exercising device. The controller 120 can identify whether there is a problem with the user's eyes according to the video information captured by the detector 130, and if so, an eyeball exercise program suitable for the user is formulated.

In summary, the above-mentioned eye exercising device provided by this embodiment adopts advanced technologies such as remote control technology, detection technology, display technology, and intelligent control technology, and uses comfortable light to remotely guide users to exercise their eyes, which can effectively avoid hurting the eyes. More importantly, the eye exercising device can detect the problems of eyes in time by recording eye movement conditions by the detector 130 (such as speed and track), and contrapuntally guide the user to exercise their eyes according to the user s eye conditions, thereby to enable the user to effectively protect their eyes.

In addition, the above-mentioned eye exercising device provided by this embodiment can be set up on a desk, or hung on a wall, can be placed in a bedroom, office, living room, study, and the like, and can even be placed in public places such as a bus, subway, library, square, etc. It can remind people to free themselves from mobile phones and computers anytime, anywhere, and take time to rest and exercise their eyes. The eye exercising device can also be used as sleeping lights, wall decorations, desktop ornaments, ceiling lights, etc. Moreover, the eye exercising device has low cost, and pertains to a self-healing treatment for the user without side effects, with significant effect in persistent use, also does not need to be carried by the user, and even not need to be worn on the forehead to press the neural network around the eyes.

Figure 11:
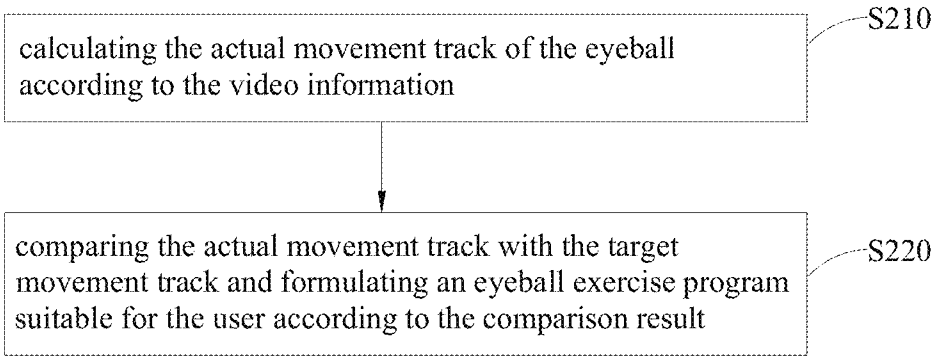
FIG. 11 is a flow diagram of one example of Step S200 of the eye exercising method in the embodiment shown in FIG. 10.

In one of the embodiments, please refer to FIG. 11. The above-mentioned step S200 includes the following sub steps.

S210 of calculating the actual movement track of the eyeball according to the video information.

In this step, each frame of image can be extracted from the video information. After that, the target detection algorithm is used to detect the position of the eyeballs in each frame of image, and then the positions of the eyeballs in all the images are combined to get the actual eyeball movement track.

S220 of comparing the actual movement track with the target movement track and formulating an eyeball exercise program suitable for the user according to the comparison result.

Wherein, the actual movement track is the track of the user's eye movement when the eye exercising device instructed the user to exercise his/her eyes last time (that is, the most recent time). The target movement track is the movement track formulated by the eye exercising device when it instructed the user to exercise the eyes last time (that is, the most recent time).

The controller 120 compares the actual movement track of the eyeball with the target movement track. If a deviation is found, it means that something is wrong with the user's vision, then the controller 120 can perform corresponding guidance exercises for the user when the user exercises his/her eyes next time. For example, the controller 120 can increase the number of circular movements of all the light-emitting units 110, and thereby prolong the total duration of eyeball exercise.

Figure 12:
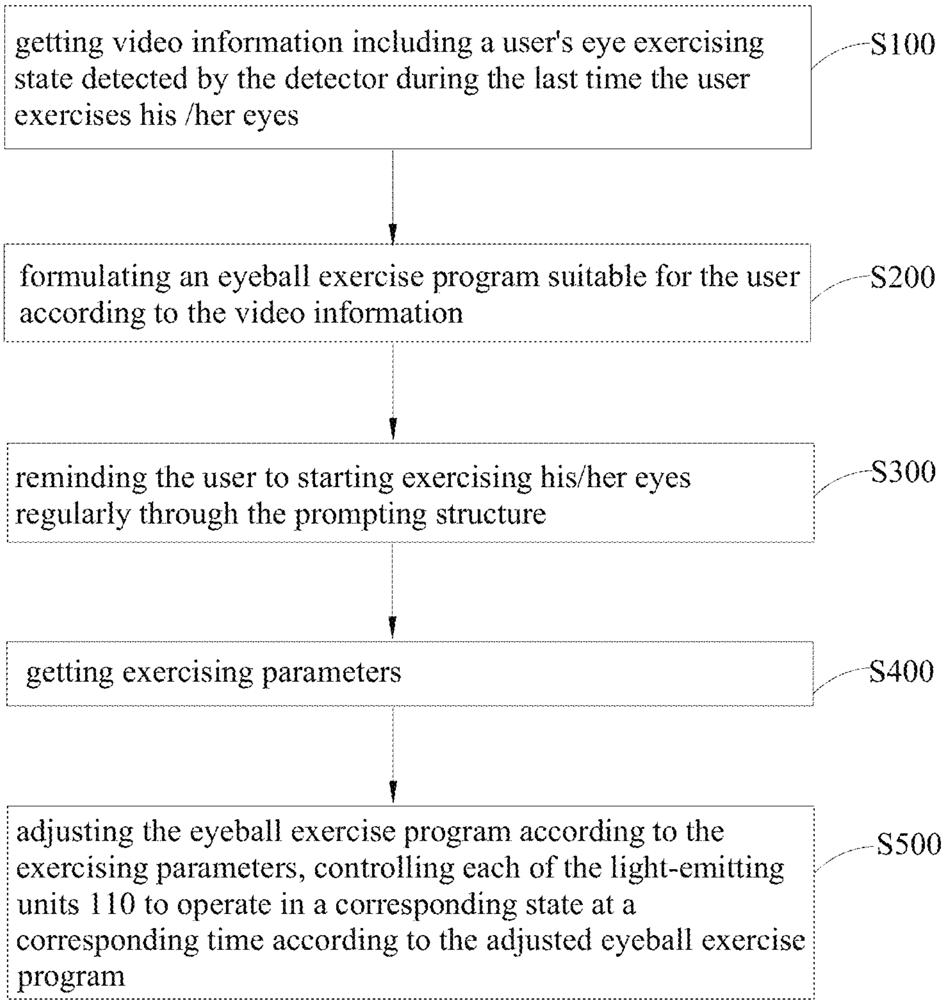
FIG. 12 is a flow diagram of one example of the eye exercising method in the embodiment shown in FIG. 10.

In one of the embodiments, on the premise that the eye exercising device further includes the prompting structure 140, the following step is further included before the above-mentioned step S500, please refer to FIG. 12.

S300 of reminding the user to starting exercising his/her eyes regularly through the prompting structure 140.

In this embodiment, the eye exercising device can prompt the user to stop working at a fixed time (for example, every 1 hour) through the prompting structure 140, and to exercise and rest the eyes for a short time. By moving the eyeballs, the purposes such as relaxing neural network around the eyes, eliminating toxins from the eyes, and improving the function of the eye muscles can be achieved.

Further, the following step is also included before the above-mentioned step S500, please continuously refer to FIG. 7:

S400 of getting exercising parameters.

The exercising parameters can be directly input by the user to the eye exercising device, or wirelessly sent to the eye exercising device by other equipment. The exercising parameter is, for example, a exercising intensity level. The exercising intensity level is different, in that way, the speed of the light spot movement and/or the total paths of the movement are different. The exercising parameters may also include different types of exercising modes. The types of exercising modes may include, for example, exercising eye muscles and adjusting eye axis.

Meanwhile, the above-mentioned S500 is that: adjusting the eyeball exercise program according to the exercising parameters, controlling each of the light-emitting units 110 to operate in a corresponding state at a corresponding time according to the adjusted eyeball exercise program.

For example, if the exercising parameters include exercising intensity levels, when the user wants to exercise the eyes with high intensity and selects the high exercising intensity level, the controller 120 can adjust the eyeball exercise program that has been formulated, such as increasing the speed of light spot movement, or increasing the number of cycles of light spot movement to extend the duration of user exercise. If the exercising parameters include different types of exercising modes, when the user selects the exercising mode of exercising eye muscles, the controller 120 will control the light-emitting unit 110 to form a light spot that moves with a certain running track, when the user selects the exercising mode of adjusting the eye axis, the controller 120 will control the light-emitting unit 110 to form a pattern with changing size.

It should be noted that the execution order of the steps in the eye exercising method shown in FIG. 12 is not limited to one case. For example, S300 can also be executed before S100 or S200.

Each technical feature of the above-mentioned embodiments can be combined arbitrarily. In order to make the description concise, all possible combinations of each technical feature in the above-mentioned embodiments are not described. However, as long as there is no contradiction in the combination of these technical features, all the combination should be deemed as the scope of this description.

The above-mentioned embodiments only show several implementation modes of the present invention, and the description is relatively specific and detailed, but it should not be understood as a limitation on the scope of the invention patent. It should be pointed out that all the modifications and improvements made by the person skilled in the art without departing from the concept of the present invention fall within the protection scope of the present invention. Therefore, the protection scope of the present invention should be subject to the appended claims.

What is claimed is:

1. An eye exercising device, comprising: a carrier, a controller, and two or more than two light-emitting units, wherein each of the light-emitting units is sequentially mounted on the carrier, and the light-emitting unit is electrically connected with the controller, the controller is used to control each of the light-emitting units to operate in a corresponding state at corresponding time according to an eyeball exercise program to generate a moving light spot for human eyes, each of the light-emitting units comprises a light source and a light-extraction module which comprises a light-mixing unit, a light-homogenizing unit, and a light path adjusting unit, the light source is electrically connected to the controller, the light-extraction module is used to adjust dazzling light emitted by the light source such that the dazzling light emitted by the light source and divergently distributed in a three-dimensional space is transformed into a visual guide target with boundaries for human eyes to recognize, brightness at a center of the visual guide target is reduced and the moving light spot with boundaries is generated for instructing eyeballs of the human eyes to do exercising;

wherein the light-extraction module is further configured to adjust color temperature and/or light intensity distribution of the light emitted by the light source; and wherein the light-emitting units are arranged in a spiral shape, and the light-emitting unit is ladybug-shaped.

2. The eye exercising device according to claim 1, wherein the eye exercising device further comprises a detector electrically connected to the controller, the detector is used to get video information including a user's eye exercising state, and send the video information to the controller, the controller is used to formulate the eyeball exercise program suitable for the user according to the video information, and control each of the light-emitting units to operate in a corresponding state at corresponding time according to the eyeball exercise program.

3. The eye exercising device according to claim 1, wherein an outside of the light-emitting unit is covered with a protective layer, the protective layer has effects of softening light, homogenizing light, and decorating, so as to improve comfort of human eyes.

4. The eye exercising device according to claim 3, wherein the protective layer is a light-transmitting Polycarbonate material or tempered glass.

5. The eye exercising device according to claim 1, wherein the eye exercising device further comprises a prompting structure electrically connected to the controller, the controller is used to remind the user to exercise his/her eyes regularly by the prompting structure.

6. The eye exercising device according to claim 5, wherein the prompting structure is a clock module, and the controller is used to remind the user to exercise his/her eyes for a short time at a certain time interval through the clock module, or the prompting structure is a luminous signal to remind the user to exercise his/her eyes regularly.

7. The eye exercising device according to claim 1, wherein a movement track of the moving light spot is adjustable.

8. The eye exercising device according to claim 7, wherein the light path adjusting unit is used to adjust the light path to generate the moving light spots with arrows, circles, hearts, animal shapes or plant shapes that are easy for users to recognize; and each of the light-extraction modules further includes:

a light-isolating component located between adjacent light sources to prevent the lights emitted by the adjacent light sources from intersecting each other; and a light-extraction adjustment module comprising a directional light-emitting component and a light guide film.

9. The eye exercising device according to claim 1, wherein the light-emitting units of a first set number are arranged in a column along longitudinal direction, the light-emitting units of a second set number are arranged in a row along transverse direction, and the row intersects with the column and the longitudinal direction is perpendicular to the transverse direction as well; or the light-emitting units of a third set number are arranged in an ellipse, and the light-emitting units of a fourth set number extend from a first vertex of the ellipse to a second vertex of the ellipse within the ellipse, and the light-emitting units of a fifth set number extend from a third vertex of the ellipse to a fourth vertex of the ellipse within the ellipse, wherein the first vertex, the third vertex, the second vertex, and the fourth vertex are connected in sequence to form a rectangle; or all the light-emitting units are arranged in a spiral shape.

10. The eye exercising device according to claim 9, wherein the light-emitting units of a first set number are arranged in a column along longitudinal direction, the light-emitting units of a second set number are arranged in a row along transverse direction, and the row intersects with the column and the longitudinal direction is perpendicular to the transverse direction as well, and a shape of the light-extraction module is rose-shaped.

11. The eye exercising device according to claim 9, wherein the light-emitting units are arranged in a fold line shape, and the light path adjusting unit is a lens, and the moving light spot is ladybug-shaped.

12. The eye exercising device according to claim 1, wherein each of the light-emitting units is provided with a protection circuit.

13. An eye exercising device, comprising: a carrier, a controller, a detector and two or more than two light-emitting units, wherein the detector electrically is connected to the controller, each of the light-emitting units is sequentially mounted on the carrier, and the light-emitting unit is electrically connected with the controller, the controller is used to control each of the light-emitting units to operate in a corresponding state at corresponding time according to an eyeball exercise program, the light-emitting unit comprises a light source configured to generate light and a light-extraction module, the light source is electrically connected to the controller, the light-extraction module is configured to adjust the light emitted by the light source to generate a moving light spot for human eyes, wherein the controller comprises functional modules executing the following steps:

getting video information including a user's eye exercising state detected by the detector during the time the user exercises his/her eyes, formulating an eyeball exercise program suitable for the user according to the video information, wherein the functional module of formulating the eye exercise program suitable for users according to the video information executes following steps, calculating an actual movement track of the eyeball according to the video information, and comparing the actual movement track with a target movement track and formulating the eyeball exercise program suitable for the user according to a comparison result, controlling each of the light-emitting unit to operate in a corresponding state at a corresponding time, according to the eyeball exercise program.

14. The eye exercising device according to claim 13, the functional module of controlling each of the light-emitting units to operate in a corresponding state at a corresponding time, according to the eyeball exercise program executes the following step, controlling color, brightness, color temperature, and light-emitting time of each light-emitting unit according to the eyeball exercise program by the controller to achieve precise control of a moving speed and path of the moving light spot, or controlling the color and intensity changes of multiple light-emitting units by the controller to adjust the user's eye muscles by achieving a dynamic effect that a light spot path gradually changes, or to adjust the user's eye axis by forming patterns that change in size and definition.

15. The eye exercising device according to claim 14, wherein precise control of the moving speed and path of the moving light spot made by the functional module of the controller with control of the color, brightness, color temperature, and light-emitting time of each light-emitting unit, comprises following options:

a first option with following sub options that:

(1) the moving light spot stays in an upper left corner of the carrier fort seconds;

(2) the moving light spot stays in an upper right corner of the carrier for t seconds;

(3) the moving light spot stays in a lower right corner of the carrier for t seconds;

(4) the moving light spot stays in a lower left corner of the carrier for t seconds, or a second option with following sub options that:

(1) the moving light spot rotates clockwise, and a speed is n rev/min;

(2) the moving light spot rotates counterclockwise, and a speed is n rev/min, or a third option with following sub options that:

(1) the moving light spot moves from a middle of the carrier to left and right sides of the carrier, a view of two eyes follows the movement of the moving light spot respectively, and a displacement speed of the moving light spot is x mm/s;

(2) the moving light spot moves up and down of the carrier from the middle of the carrier, and the view of the two eyes follows the movement of the moving light spot respectively, and the displacement speed of the moving light spot is y mm/s, or a fourth option with following sub options that:

(1) the moving light spot moves clockwise from a center of the carrier to the left of the carrier along "∞", and the displacement speed is m mm/s;

(2) the moving light spot moves counterclockwise from the center of the carrier to the left of the carrier along "∞", and the displacement speed is m mm/sec, or a fifth option that the moving light spot moves along a fold line at a speed v to a termination of the fold line, and then returns along an original path, looping so in turn, or a sixth option that the moving light spot starts from a bottom of the carrier, then moves along a spiral line at a speed v to a top end of the carrier, and then returns along the original path, looping so in turn.

16. The eye exercising device according to claim 13, wherein before the functional module of controlling each of the light-emitting units to operate in a corresponding state at a corresponding time, according to the eyeball exercise program, the device further comprises the functional module executing following steps, getting exercising parameters, adjusting the eyeball exercise program according to the exercising parameters, and controlling each of the light-emitting units to operate in a corresponding state at a corresponding time according to the adjusted eyeball exercise program.

17. An eye exercising device, comprising: a carrier, a controller and two or more than two light-emitting units, wherein each of the light-emitting units is sequentially mounted on the carrier, and the light-emitting unit is electrically connected with the controller, the controller is used to control each of the light-emitting units to operate in a corresponding state at corresponding time according to an eyeball exercise program, the light-emitting unit comprises a light source and a light-extraction module, the light source is electrically connected to the controller, the light-extraction module is used to adjust the light emitted by the light source to generate a moving light spot for human eyes, wherein the controller comprises a functional module executing the following step:

control each of the light-emitting unit to operate in a corresponding state at a corresponding time, according to the eyeball exercise program;

wherein the functional module of controlling each of the light-emitting units to operate in a corresponding state at a corresponding time, according to the eyeball exercise program executes a following step, controlling color, brightness, color temperature, and light-emitting time of each light-emitting unit according to the eyeball exercise program by the controller to achieve precise control of a moving speed and path of the moving light spot, or controlling color and intensity changes of multiple light-emitting units by the controller to adjust the user's eye muscles by achieving a dynamic effect that a light spot path gradually changes, or to adjust the user's eye axis by forming patterns that change in size and definition, precise control of the moving speed and path of the moving light spot made by the functional module of the controller with control of the color, brightness, color temperature, and light-emitting time of each light-emitting unit, comprises the following options:

a first option with following sub options that:

(1) the moving light spot stays in an upper left corner of the carrier for t seconds;

(2) the moving light spot stays in an upper right corner of the carrier for t seconds;

(3) the moving light spot stays in a lower right corner of the carrier for t seconds;

(4) the moving light spot stays in a lower left corner of the carrier for t seconds, or a second option with following sub options that:

(1) the moving light spot rotates clockwise, and a speed is n rev/min;

(2) the moving light spot rotates counterclockwise, and a speed is n rev/min, or a third option with following sub options that:

(1) the moving light spot moves from a middle of the carrier to left and right sides of the carrier, a view of two eyes follows the movement of the moving light spot respectively, and a displacement speed of the moving light spot is x mm/s;

(2) the moving light spot moves up and down of the carrier from the middle of the carrier, and a view of the two eyes follows the movement of the moving light spot respectively, and the displacement speed of the moving light spot is y mm/s, or a fourth option with following sub options that:

(1) the moving light spot moves clockwise from a center of the carrier to the left of the carrier along "∞", and the displacement speed is m mm/s;

(2) the moving light spot moves counterclockwise from the center of the carrier to the left of the carrier along "∞", and the displacement speed is m mm/sec, or a fifth option that the moving light spot moves along a fold line at a speed v to a termination of the fold line, and then returns along an original path, looping so in turn, or a sixth option that the moving light spot starts from a bottom of the carrier, then moves along a spiral line at a speed v to a top end of the carrier, and then returns along the original path, looping so in turn.

18. The eye exercising device according to claim 17, wherein the eye exercising device further comprises a detector electrically connected to the controller, and the controller further executes following steps:

getting video information including a user's eye exercising state detected by the detector during the time the user exercises his/her eyes; and formulating an eyeball exercise program suitable for the user according to the video information.

19. The eye exercising method device according to claim 17, the functional module of formulating the eye exercise program suitable for users according to the video information executes the following steps, calculating an actual movement track of the eyeball according to the video information, comparing the actual movement track with a target movement track and formulating the eyeball exercise program suitable for the user according to a comparison result.

* * * * *